United States Patent [19]

Adams

[11] 4,278,176

[45] Jul. 14, 1981

[54] GRADIENT TUBE RACK AND METHOD

[75] Inventor: Mark B. Adams, Salt Lake City, Utah

[73] Assignee: University of Utah, Salt Lake City, Utah

[21] Appl. No.: 53,876

[22] Filed: Jul. 2, 1979

[51] Int. Cl.³ .................... A47B 73/00; G01N 21/01

[52] U.S. Cl. .................................... 211/74; D24/32; 206/443; 312/209; 356/244

[58] Field of Search .................... 312/206, 209, 207; 211/74, 71, 72; 206/443; D24/32; 256/419, 244

[56] References Cited

U.S. PATENT DOCUMENTS

| | | | |
|---|---|---|---|
| 59,086 | 10/1866 | Skinner | 312/209 |
| D. 195,027 | 4/1963 | Gulotta | D24/32 |
| D. 231,734 | 6/1974 | Sendra et al. | D24/32 |
| 1,224,562 | 5/1917 | Newman | 211/74 |
| 2,046,864 | 7/1936 | Baker | 211/74 X |
| 2,725,782 | 12/1955 | Worley | 211/74 |
| 2,802,391 | 8/1957 | Maier | 211/74 X |
| 3,175,695 | 3/1965 | Goodman et al. | 356/244 |
| 3,186,556 | 6/1965 | Forsstrom | 211/74 |
| 3,196,229 | 7/1965 | Glass | 206/443 |
| 3,441,352 | 4/1969 | Hughes | 356/244 |
| 3,531,211 | 9/1970 | Staunton | 356/244 |
| 3,751,172 | 8/1973 | Seitz et al. | 356/244 |
| 3,977,794 | 8/1976 | Liedholz | 356/244 |
| 4,068,798 | 1/1978 | Rohde | 211/74 X |
| 4,142,633 | 3/1979 | Raghavachari | 206/443 X |

*Primary Examiner*—James T. McCall

[57] ABSTRACT

A gradient tube holder and method for securely supporting gradient tubes for observation and access to a gradient therein. The gradient tube holder is pedestal-mounted and includes gradient tube-receiving bores, the bores being formed adjacent an edge so that a longitudinal slot can be formed along the length of the bore. A light shield surrounds the slots to shield the slots against extraneous light thereby enhancing visibility of the gradient tubes.

10 Claims, 2 Drawing Figures

GRADIENT TUBE RACK AND METHOD

ACKNOWLEDGEMENT

This invention was produced using funds supplied by the National Institute of Health, Department of Health, Education and Welfare, Grant No. 2R01-GM-21975-04.

BACKGROUND

1. Field of the Invention

This invention relates to gradient tube racks and, more particularly, to a gradient tube rack that is adapted to securely hold gradient tubes while shielding the same against extraneous light while accommodating a high intensity point source of light thereby permitting enhancement of the visibility of a gradient in the gradient tubes.

2. The Prior Art

Numerous qualitative, purification, concentration, and quantitative analysis procedures utilize a gradient tube for determining or otherwise separating phases of slightly different densities. For example, the concentration of a viral sample involves placing a quantity of diluted and "contaminated" liquid with a viral sample dispersed therein in a gradient tube and subjecting the gradient tube, and thereby the sample, to high speed centrifugation. The centrifugation causes a separation and concenration of the various components of the liquid sample according to their respective densities, the heavier density components being toward the base of the gradient tube. The separation usually results in a well-defined gradient which is clearly visible in the gradient tube.

However, it is well-known in the art that it is extremely difficult to observe many purified samples because of the extremely small sample involved and also the relatively small differences in the index of refraction of the various layers within the gradient tube. It has therefore become customary for at least one researcher to fabricate a gradient tube light shield from a cardboard box. The cardboard box is prepared as a shadow box for the gradient tube by orienting the box on its side with the open top toward the researcher. Holes are cut in the top surface of the box with the diameter of the holes being slightly smaller than the diameter of the gradient tubes. The gradient tubes are placed in the cardboard box by being inserted downwardly through the holes with the cardboard edges of the holes frictionally engaging the tubes and thereby suspending the tubes inside the box.

Frequently, the interior of the box is painted with a flat black pait to further enhance visibility of the gradient tubes suspended therein. A light is directed downwardly into the gradient tubes to provide an enhancement of the visibility of the sample or samples within the gradient tube, with the cardboard box blocking extraneous light as a shadow box. However, it is well-known that gradient tubes frequently slip out of the holes and drop into the box with a resulting spillage of the sample contained therein. Not only is valuable researcher time wasted in preparing other samples but sample spillage can also result in unwanted viral and possibly even radioactive contamination.

In addition to providing a visual determination of a sample (or samples) within a gradient tube, the gradient tube may be fabricated from a suitably penetrable plastic material such as a polycarbonate plastic. The plastic permits penetratio with a hypodermic needle at the gradient to withdraw the gradient from the gradient tube through the hollow needle. Furthermore, since the gradient is frequently suspended between an upper and a lower phase of differing densities, it is also customary to puncture the bottom of the tube and allow the contents to drip into a catchment basin thereby removing the lower liquid sample below the gradient into one catchment basin. A change in catchment basins allows the operator to recover the gradient selectively removed thereby from the gradient tube. Either of the foregoing procedures requires a stable platform for supporting the gradient tubes.

An additional procedure involving several gradient samples in different gradient tubes and referred to as equilibrium gradients involves comparing the gradient level in each tube with the gradient level in the adjacent tubes. This procedure is extremely difficult if not impossible to accomplish using the foregoing cardboard box technique.

Various test tube racks and analysis systems are known in the art and the following are references which are known to the inventor:

Seitz, et al (U.S. Pat. No. Des. 231,444) discloses a design for a test tube rack, the rack including vertical slots extending part of the length of any test tubes supported therein.

Dovas (U.S. Pat. No. 2,741,913) discloses a test tube rack fabricated from a solid block of transparent plastic material. Longitudinal slots are formed along the entire length of the tubes holes. A set of graduated scales are placed along one edge of the slots.

Walsh (U.S. Pat. No. 3,109,084) discloses a test tube heater including a test tube holder prepared from a solid block of material and having longitudinal slots formed adjacent the base of the holder.

Kahlenberg (U.S. Pat. No. 3,142,385) discloses a culture tube rack having a plurality of horizontal, parallel plate members with resilient wires mounted to the plates for securing the culture tubes in the rack.

Forrstrom (U.S. Pat. No. 3,186,556) discloses a test tube rack consisting of two hinged sections which fold relative to each other to adapt the test tube rack to be free-standing. Inspection openings are provided adjacent the lower portions of the rack to permit inspection of the tubes.

Auphan, et al (U.S. Pat. No. 3,607,097) discloses an automated analyzer for liquid samples wherein a series of tubes having penetrable walls are carried past a series of needles for penetrating the walls of the tube.

Gulgan, et al (U.S. Pat. No. 3,620,678) dislcoses an automated analysis apparatus for analyzing or otherwise measuring physiological data in biological samples. The samples are encapsulated in a transparent, flexible material and sequentially subjected to the individual laboratory tests on a continuous moving belt.

While the foregoing list of references has come to the attention of the inentor, no representation is made that all of these references may be "prior art" within the meaning of that term under the provisions of 35 USC 102 or 35 USC 103, although these references are disclosed herein so as to fully comply with the duty of candor and good faith as required by 37 CFR 1.56.

In view of the foregoing, it would be a significant advancement in the art to provide a gradient tube rack which securely supports a plurality of gradient tubes while shielding the gradient tubes against extraneous light. It would also be an advancement in the art to provide a gradient tube rack which is supported on a pedestal to permit access underneath the gradient tubes for selectively draining contents therefrom. Such an apparatus and method is disclosed and claimed herein.

BRIEF SUMMARY AND OBJECTS OF THE INVENTION

The present invention relates to a gradient tube rack and method, the gradient tube rack securely supporting gradient tubes while enhancing visibility of any gradients therein by shielding the gradient tubes against extraneous light and accommodating a high-intensity point source of light from above. The gradient tube rack includes a downwardly-directed, tube-receiving bore having a diameter incrementally larger than the diameter of the gradient tube. A shelf in the base of each bore receives the end of the gradient tube in abutting relationship. A longitudinal slot extends the length of the bore and permits viewing and access to the gradient tube placed therein. The gradient tube holder is supported in a pedestal, the pedestal including a light shield around the viewing openings thereby shielding the gradient tubes against extraneous light.

It is, therefore, a primary object of this invention to provide improvements in gradient tube racks.

Another object of this invention is to provide an improved method for securely supporting gradient tubes while significantly enhancing visibility of any samples therein.

Another object of this invention is to provide an improved gradient tube rack, the tube rack including a gradient tube holder having a plurality of gradient tube-receiving bores therein, each bore including a longitudinal slot for viewing the gradient tube placed therein, the gradient tube holder being mounted in a pedestal with the pedestal also forming a light shield around the slots.

These and other objects and features of the present invention will become more fully apparent from the following description and appended claims taken in conjunction with the accompanying drawing.

DETAILED DESCRIPTION OF THE PREFERRED EMBODIMENTS

Figure 1:
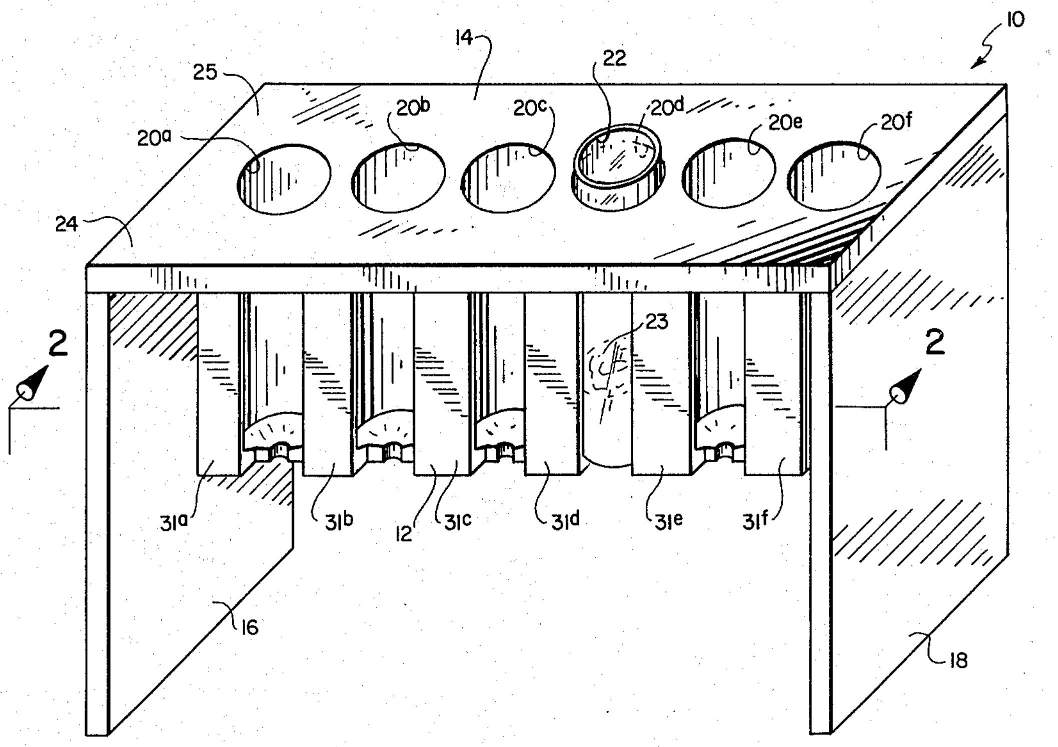
FIG. 1 is a perspective view of the gradient tube rack of this invention, the gradient tube rack including a gradient tube placed therein to further illustrate the novel features of this invention.

The invention is best understood by reference to the drawing wherein like parts are designated with like numerals throughout.

Figure 2:
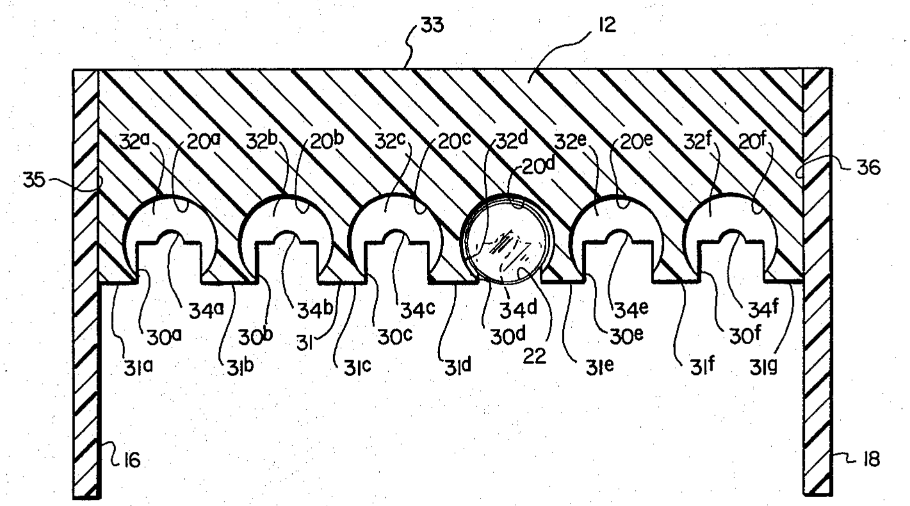
FIG. 2 is a cross section taken along lines 2—2 of FIG. 1.

Referring now to FIGS. 1 and 2, the gradient tube rack of this invention is shown generally at 10 and includes a gradient tube holder 12 supported by a pedestal formed by legs 16 and 18, the forward portion of legs 16 and 18 cooperating with an upper ledge 24 to form a light shield around a forward face 31 of gradient tube holder 12. Gradient tube holder 12 is fabricated from a solid, rectangular block of suitable material such as a plastic, or the like, and includes front face 31, rear face 33, and ends 35 and 36. A top 25 is coextensive with ledge 24 and is parallel to the bottom surface (not shown).

A plurality of vertical, gradient tube-receiving bores 20*a*–20*f* are formed in gradient tube holder 12 adjacent face 31. Bores 20*a*–20*f* intersect face 31 and thereby expose the bore along its length in an enlarged slot 30*a*–30*f*, respectively. Preferrably, the width of slots 30*a* –30*f* is selectively predetermined to equal approximately 80 percent of the diameter of bores 20*a*–20*f* and thereby accommodate a gradient tube of the appropriate size placed therein. Advantageously, all commercially available gradient tubes are provided in predetermined sizes in the trade and it is, therefore, a simple matter to determine the appropriate size and placement of bores 20*a*–20*f* relative to front face 31 and, correspondingly, predetermine the width of slots 30*a*–30*f*. The diameter of bores 20*a*–20*f* is also specifically predetermined so as to be slightly larger than the diameter of gradient tube 22 (FIG. 1) so as to slideably receive gradient tube 22 therein.

The depth or length of bores 20*a*–20*f* is also selectively predetermined so as to receive gradient tube 22 while leaving a portion of the upper end suitably exposed for insertion and removal of gradient tube 22. The lower end of each of bores 20*a*–20*f* terminate uniformly in shelves 32*a*–32*f*, respectively. Each of shelves 32*a*–32*f* include notches 34*a*–34*f*, respectively, which are prepared in the form of semicircular throughbores to accommodate access to the axial bottom of gradient tube 22. Additionally, the edges of slots 30*a*–30*f* are milled to remove any sharp corners therefrom and the milling extended through the diameter of shelves 32*a*–32*f* to permit access and to provide visibility along the entire length of gradient tube 22.

Gradient tube rack 10 is fabricated from a suitable material such as a plastic, or the like, and is rendered suitably opaque on at least the external surfaces to block extraneous light. Advantageously, gradient tube rack 10 may be injection molded from a black or otherwise opaque plastic material or may be rendered opaque with a suitable paint, dye, or the like, covering the external surfaces. Preferentially, gradient tube holder 12 is fabricated from a solid block of material so as to impart a desired degree of weight to gradient tube rack 10 thereby enhancing stability.

In operation, a gradient tube, shown herein as a representative gradient tube 22, is prepared by conventional centrifugation techniques to produce a gradient, illustrated schematically as gradient 23. Thereafter, gradient tube 22 is inserted into any one of the gradient tube-receiving bores 20*a*–20*f* with the base of gradient tube 22 resting against the appropriate shelf 32*a*–32*f*, respectively. Since the depth of bores 20*a*–20*f* is selectively predetermined based upon the overall length of gradient tube 22, a portion of gradient tube 22 extends above gradient tube rack 10 thereby permitting the operator (not shown) to readily grasp the top of gradient tube 22 for removal. Additionally, the diameter of bores 20*a*–20*f* is selectively predetermined to accommodate dimensional changes within the diameter of gradient tube 22 under the forces exerted thereon during the centrifugation process. For example, it is well-known that the polycarbonate material from which gradient tube 22 is fabricated has a tendency to distend slightly under the forces imposed by the centrifugation process. Accordingly, if the diameter of bores 20*a*–20*f* closely conformed to the original diameter of gradient tube 22, the centrifuged gradient tube 22 would not fit within bores 20*a*–20*f*. Furthermore, the diameter of bores 20*a* –20*f* need not closely conform to the diameter of gradient tube 22 since shelves 32*a*–32*f*, respectively, adequately support gradient tube 22.

With gradient tube 22 supported in gradient tube rack 10, a substantial portion of gradient tube 22 can be observed through the respective slot 30a–30f. Additionally, the forwardly-extending portions of legs 16 and 18 in combination with ledge 24 serve as a light shield to block a substantial portion of the extraneous or ambient light that would otherwise impinge upon gradient tube 22 and, more particularly, gradient 23 therein. Furthermore, since the surrounding material of gradient tube holder 12 is suitably prepared so as to exclude light, very little extraneous light strikes gradient 23 to obscure a gradient 23 of low visibility. The visibility of gradient 23 is significantly enhanced by directing a light from a suitable light source (not shown) downwardly along the axis of gradient tube 22. Gradient 23 is delineated in a much greater detail and is much more readily observable than if gradient tube 22 were exposed in a conventional, unshielded test tube rack. Thereafter, the operator (not shown) can follow any of the conventional procedures in dealing with gradient 23. For example, the operator can penetrate the wall of gradient tube 22 at gradient 23 with a hollow needle such as a hypodermic syringe and use the same to withdraw gradient 23 from gradient tube 22. The operator may also extract the sample through the open top of gradient tube 22 by using a syringe or a Pasteur pipette although he may experience a slight awkwardness in bypassing the light source (not shown). Alternatively, the operator can penetrate the base of gradient tube 22 by upwardly inserting an appropriate penetrating device through the notch 34a–34f in shelf 32a–32f, respectively, which is located at the axis and, thereby, the lowermost point of gradient tube 22. After penetration, the operator can place a catchment basin (not shown) beneath gradient tube 22 and allow any liquid underlying gradient 23 to drain from gradient tube 22. Upon gradient 23 reaching the base of gradient tube 22, the operator can readily replace the catchment basin with another catchment basin (not shown) to capture gradient 23.

If desired, the operator (not shown) can also place a plurality of suitably prepared gradient tubes 22 in each of bores 20a–20f to readily observe the relative position of gradient 23 in each. Importantly, when used in conjunction with a light source (not shown), the light shielding capabilities of gradient tube rack 10 readily accommodate the visual observance of gradients 23 even though the gradients 23 would be relatively invisible when viewed outside gradient tube rack 10.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes that come within the meaning and range of equivalency of the claims are to be embraced within their scope.

What is claimed and desired to be secured by a United States Letters Patent is:

1. A gradient tube rack comprising:

a gradient tube holder comprising a body having a plurality of upwardly-opening, gradient tube receivers therein, each gradient tube receiver including a longitudinal slot therein forming a viewer opening for viewing a substantial portion of the length of a gradient tube placed in the gradient tube receiver, each gradient tube receiver having a shelf in the lower end thereof for receiving an end of a downwardly-inserted gradient tube in abutting relationship;

access means in each shelf for providing access to the bottom of the gradient tube at a location coaxial with the gradient tube;

a stand for supporting the gradient tube holder above a surface, the stand comprising a vertical, planar element secured to each end of the gradient tube holder and extending forwardly therefrom; and light shield means for shielding the viewer openings in the gradient tube holder against at least a portion of the ambient light said light shield means comprising a horizontal, planar top element extending forwardly from the top of the gradient tube holder and cooperating with the vertical, planar elements of the stand to thereby form said light shield means about said viewer openings.

2. The gradient tube rack defined in claim 1 wherein the gradient tube holder is fabricated with at least the surface thereof forming a part of the light shield means.

3. The gradient tube rack defined in claim 2 wherein the gradient tube holder is fabricated from a light shielding material.

4. The gradient tube rack defined in claim 1 wherein the gradient tube holder is fabricated from a solid block of plastic material, the solid block of plastic material contributing additional weight to the gradient tube rack for improved stability.

5. A gradient tube rack comprising:

gradient tube holder means fabricated as a rectangular block of material having a top surface, a bottom surface, a front face, a back face and two ends, the block having vertical, gradient tube-receiving bores therein, the bores extending from the top surface to a position adjacent the bottom surface to thereby form a shelf in the bores above the bottom surface, a plurality of vertical slots in the front face with each vertical slot corresponding to a bore thereby providing a viewer opening along the length of the respective bore;

access means into the bottom of the bores, the access means comprising an access aperture in the shelf in the bore, the access aperture providing access to the center of the bottom of a gradient tube placed in the bore;

a pedestal for the block comprising a pair of rigid, rectangular sheets of material having a height and width incrementally greater than the dimensions of the ends of the block to thereby adapt the sheets to being incorporated as a part of a light shield for the viewer openings by the sheets being secured to each end of the block with the back face and the top surface generally coextensive with adjacent edges of the sheets; and a top shield comprising a rigid, rectangular sheet of material mounted between the ends of the pedestal extending from the front face and coextensive with the top surface.

6. The gradient tube rack defind in claim 5 wherein the gradient tube holder, pedestal, and top light shield are prepared with light shielding capability.

7. The gradient tube rack defined in claim 5 wherein each bore is configurated as a cylindrical bore having a diameter incrementally greater than the diameter of a gradient tube to thereby accomodate interference-free insertion and removal of gradient tubes having limited dimensional changes incurred upon centrifugation.

8. A method for enhancing visibility of a gradient in a gradient tube comprising:
preparing a gradient tube holder by forming a plurality of vertical bores in a rectangular block of material, each bore having a tube-receiving shelf adjacent the lower end, a viewer opening along the length of the bore and a diameter incrementally greater than the diameter of a gradient tube;
forming an access aperture in each tube-receiving shelf, the access aperture permitting access to the center of the tube placed in the bore;
mounting the gradient tube holder to a pedestal to support the gradient tube holder above a surface with the bores vertical;
forming a part of the pedestal as a light shield thereby shileding the viewer openings against ambient light by enclosing the ends of the block with a portion of the pedestal and extending a planar element forwardly from the top of the block, the planar element cooperating with the portion of the pedestal to form a light shield about the viewer openings;
placing a gradient tube in a bore; and
directing a light source downwardly into the gradient tube, the light shield blocking extraneous light thereby enhancing visibility of the gradient under the light source.

9. The method defined in claim 8 wherein the forming step further comprises placing a gradient tube in a bore and puncturing the gradient tube from the acccess aperture and observing the downwardly-moving gradient through the viewer opening while draining the gradient tube.

10. The method defined in claim 9 wherein the preparing step comprises fabricating the block to have an opacity to the transmission of light.

* * * * *

UNITED STATES PATENT AND TRADEMARK OFFICE

CERTIFICATE OF CORRECTION

PATENT NO. : 4,278,176

DATED : July 14, 1981

INVENTOR(S) : Mark B. Adams

It is certified that error appears in the above-identified patent and that said Letters Patent are hereby corrected as shown below:

Column 1, line 52, "pait" should be --paint--
Column 1, line 68, "penetratio" should be --penetration--
Column 7, line 16, "shileding" should be --shielding--
Column 8, line 11, "acccess" should be --access--

Signed and Sealed this

***Thirteenth* Day of *October 1981***

[SEAL]

*Attest:*

GERALD J. MOSSINGHOFF

*Attesting Officer* — *Commissioner of Patents and Trademarks*